US012603269B2

(12) United States Patent
Jeon

(10) Patent No.: US 12,603,269 B2
(45) Date of Patent: Apr. 14, 2026

(54) CATHODE ACTIVE MATERIAL DEHYDRATION APPARATUS USING ELECTROOSMOSIS, AND DEHYDRATION EQUIPMENT COMPRISING DEHYDRATION APPARATUS

(71) Applicant: KOREA WATER TECHNOLOGY INC., Busan (KR)

(72) Inventor: Se Jeong Jeon, Seoul (KR)

(73) Assignee: KOREA WATER TECHNOLOGY INC., Busan (KR)

( * ) Notice: Subject to any disclaimer, the term of this patent is extended or adjusted under 35 U.S.C. 154(b) by 686 days.

(21) Appl. No.: 18/020,076

(22) PCT Filed: May 17, 2021

(86) PCT No.: PCT/KR2021/006132
§ 371 (c)(1),
(2) Date: Feb. 6, 2023

(87) PCT Pub. No.: WO2022/045525
PCT Pub. Date: Mar. 3, 2022

(65) Prior Publication Data
US 2023/0307605 A1     Sep. 28, 2023

(30) Foreign Application Priority Data
Aug. 24, 2020     (KR) ........................ 10-2020-0106100

(51) Int. Cl.
*H01M 4/00*          (2006.01)
*H01M 4/04*          (2006.01)
(Continued)

(52) U.S. Cl.
CPC ......... *H01M 4/0438* (2013.01); *H01M 4/485* (2013.01); *H01M 2004/028* (2013.01)

(58) Field of Classification Search
CPC ...... H01M 4/0438; H01M 4/36; H01M 4/485; H01M 2004/028; B01D 61/56; B04B 5/10
See application file for complete search history.

(56) References Cited

U.S. PATENT DOCUMENTS

2014/0166946 A1    6/2014  Miwa et al.
2018/0034050 A1    2/2018  Son et al.

FOREIGN PATENT DOCUMENTS

CN        102192640 A      9/2011
JP        2013-097938 A    5/2013
(Continued)

OTHER PUBLICATIONS

Hina, Method for Detecting Calcium Scale Deposition of Electroosmosis Dewatering Device, and Method for Cleaning the Device, Oct. 2014, See the Abstract. (Year: 2014).*
(Continued)

*Primary Examiner* — Tiffany Legette
*Assistant Examiner* — Monique M Wills
(74) *Attorney, Agent, or Firm* — Revolution IP, PLLC

(57)     ABSTRACT

The present invention provides a cathode active material dehydration apparatus using electroosmosis, the dehydration apparatus accommodating a cathode active material that has passed through a washing process, and applying an electric field to the cathode active material to remove, through electroosmosis, a washing solution remaining in the cathode active material.

19 Claims, 5 Drawing Sheets

1000

(51) Int. Cl.
    *H01M 4/485*        (2010.01)
    *H01M 4/02*         (2006.01)

(56)                 References Cited

FOREIGN PATENT DOCUMENTS

| | | |
|---|---|---|
| JP | 2014188504 A * | 10/2014 |
| KR | 10-2011-0001634 A | 1/2011 |
| KR | 10-2014-0062498 A | 5/2014 |
| KR | 10-2015-0076305 A | 7/2015 |
| KR | 10-2018-0012527 A | 2/2018 |
| KR | 10-1941869 B1 | 1/2019 |
| WO | 2012-127796 A1 | 9/2012 |

OTHER PUBLICATIONS

International Search Report for PCT/KR2021/006132 mailed Aug. 13, 2021 from Korean Intellectual Property Office.

* cited by examiner

【FIG. 1】
1000
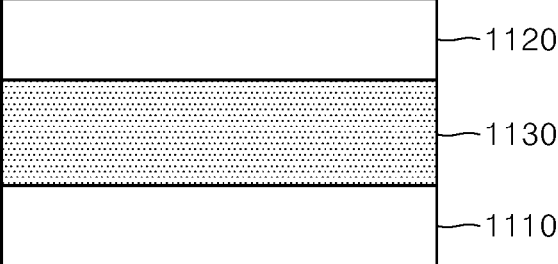
1120
1130
1110

【FIG. 2】
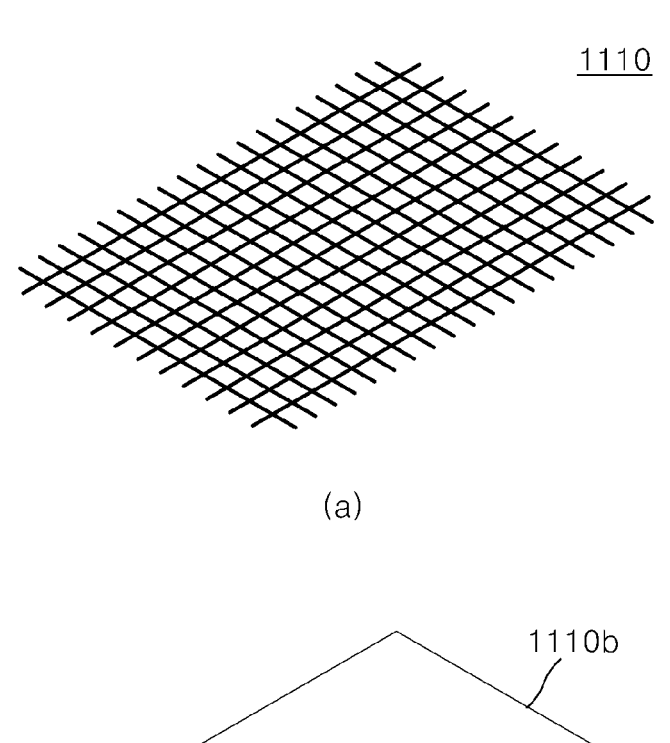
1110
(a)
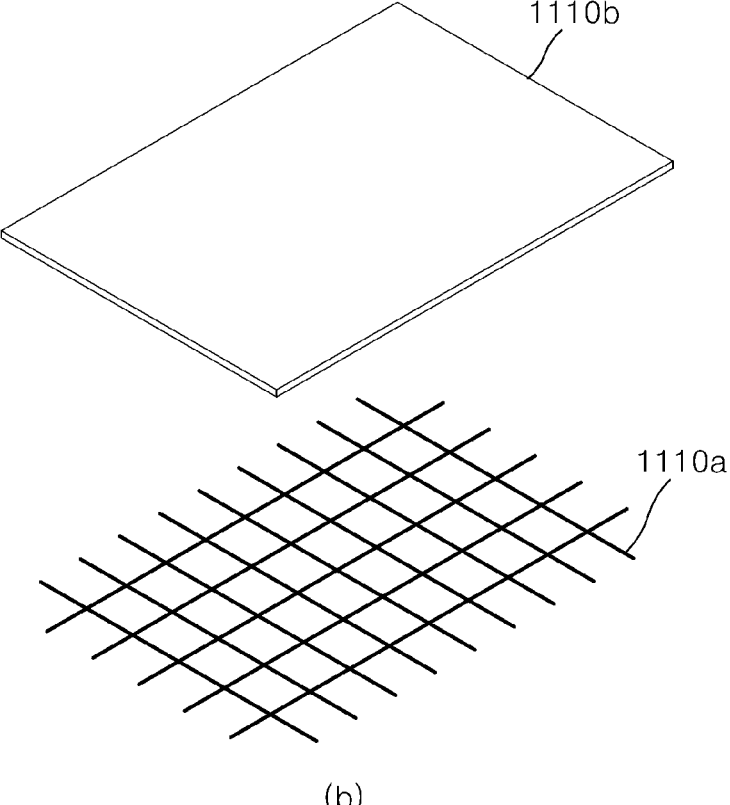
1110b
1110a
(b)

【FIG. 3】
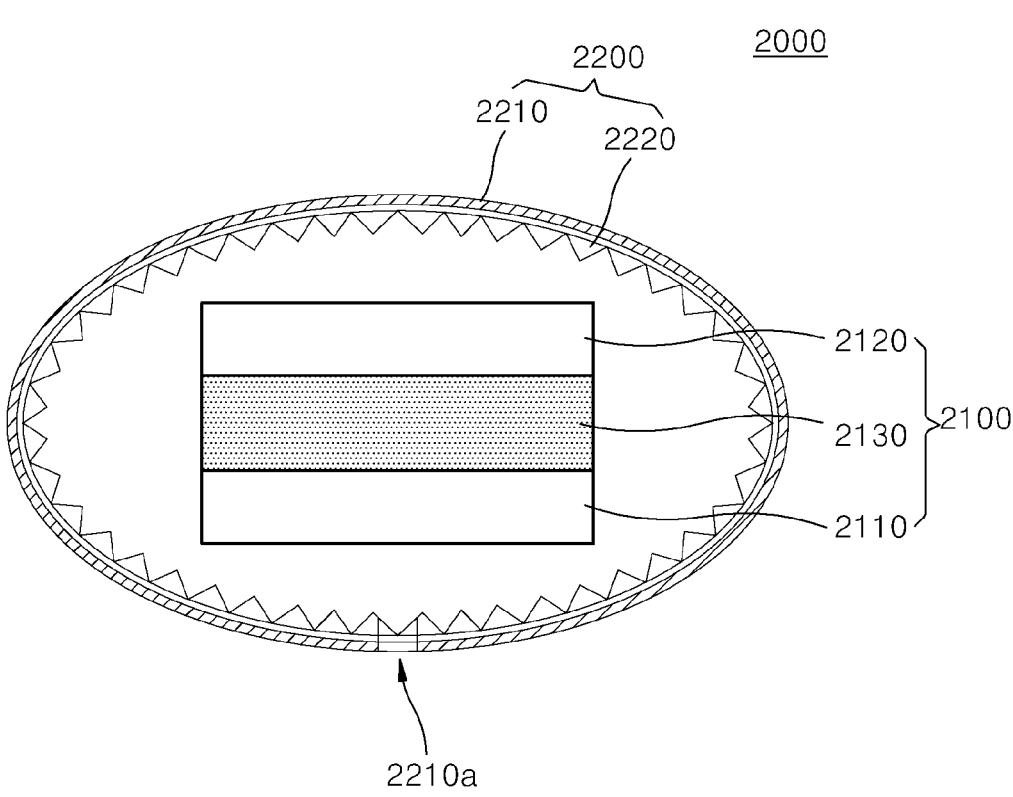

CATHODE ACTIVE MATERIAL DEHYDRATION APPARATUS USING ELECTROOSMOSIS, AND DEHYDRATION EQUIPMENT COMPRISING DEHYDRATION APPARATUS

TECHNICAL FIELD

The present invention relates to a cathode active material dehydration apparatus using electroosmosis, and more particularly, to a cathode active material dehydration apparatus using electroosmosis in which water that is not removed and remains in a cathode active material even after dehydration is performed using mechanical force can be effectively removed by using electroosmosis, and dehydration equipment including the dehydration apparatus.

BACKGROUND ART

A cathode active material as a material that participates in an anode reaction in a secondary battery such as an electric vehicle battery, is a key material that costs more than 40% of the production cost of a secondary battery. Among these secondary batteries, lithium secondary batteries having high energy density and voltage, long cycle life and low self-discharge rate have been commercialized and widely used. In this regard, lithium cobalt composite metal oxides have been mainly used as a cathode active material of a lithium secondary battery. However, when such lithium cobalt composite metal oxides are used as the cathode active material, it is insufficient to be used as a large-capacity power source. Thus, lithium manganese composite metal oxides and the like are used to replace it. Among them, research and development on lithium-nickel composite metal oxides having high reversible capacity are being actively conducted.

However, when such a lithium-nickel composite metal oxide is used as the cathode active material, when the content of nickel is increased, the ionic radius of $Ni^{2+}$ is similar to that of Li+, so that cation mixing in which Ni is located in an Li layer easily occurs. Due to this cation mixing, Li, which cannot enter the Li layer, reacts with oxygen and water that are present in the air during a firing process to make $LiCO_3$ or LiOH material called residual lithium. These materials are thickly formed on the surface of the anode and act as a resistance layer, and in addition, when these materials are melted in a solvent during the process of manufacturing an electrode for cell production, these materials basify the solvent and are mixed with a binder to gelate a slurry, so that it impossible to manufacture the electrode and these materials react with an electrolyte to generate gas. Because the battery is easily inflated and the risk of explosion increases due to these gases, it is very important to remove residual lithium.

The easiest way to remove residual lithium is by washing with water, and although residual lithium is easily removed with water, when water remaining on the surface of the active material is not removed quickly after residual lithium is removed, Li in a structure continues to escape until water is completely removed. In addition, escaped Li reacts again with water and carbon dioxide present in the surroundings during an additional heat treatment process so that residual lithium can be generated, or performance can be reduced due to Li reduction in the structure. Thus, such residual lithium needs to be quickly removed, but such residual lithium cannot be quickly removed using a mechanical dehydration method according to the related art.

DETAILED DESCRIPTION OF THE INVENTION

Technical Problem

The present invention provides a cathode active material dehydration apparatus using electroosmosis in which water that is not removed and remains in a cathode active material even after dehydration is performed using mechanical force can be effectively removed by using electroosmosis, and dehydration equipment including the dehydration apparatus.

Technical Solution

According to an aspect of the present invention, there is provided a cathode active material dehydration apparatus using electroosmosis, the cathode active material dehydration apparatus accommodating a cathode active material that has passed through a washing process, and applying an electric field to the cathode active material to remove, through electroosmosis, a washing solution remaining in the cathode active material.

According to another aspect of the present invention, there is provided cathode active material dehydration equipment using electroosmosis, the cathode active material dehydration equipment accommodating a cathode active material that has passed through a washing process in an internal space of the cathode active material dehydration equipment, and applying an electric field to the cathode active material to remove, through electroosmosis, a washing solution remaining in the cathode active material, and performing drying by heating the cathode active material in a state where the cathode active material is kept in the internal space.

According to another aspect of the present invention, there is provided cathode active material dehydration equipment using electroosmosis, the cathode active material dehydration equipment accommodating a cathode active material that has passed through a washing process in an internal space of the cathode active material dehydration equipment, and applying mechanical force to the cathode active material to remove a washing solution remaining in the cathode active material, and dehydrating the washing solution remaining in the cathode active material by applying an electric field to the cathode active material through electroosmosis in a state where the cathode active material is kept in the internal space.

According to another aspect of the present invention, there is provided cathode active material dehydration equipment using electroosmosis, the cathode active material dehydration equipment accommodating a cathode active material that has passed through a washing process in an internal space of the cathode active material dehydration equipment, and applying mechanical force to the cathode active material to remove a washing solution remaining in the cathode active material, dehydrating the washing solution remaining in the cathode active material by applying an electric field to the cathode active material through electroosmosis in a state where the cathode active material is kept in the internal space, and performing drying by heating the cathode active material in a state where the cathode active material is kept in the internal space.

Effects of the Invention

A cathode active material dehydration apparatus using electroosmosis and dehydration equipment including the dehydration apparatus according to the present invention have the following effects.

First, water that remains in a cathode active material even after dehydration is performed using mechanical force can be removed.

Second, a dehydration time is short.

Third, because no physical external force such as dehydration using mechanical force is applied to the cathode active material, the structure of the apparatus is simple.

Fourth, because a lower moisture content compared to a dehydration method only using an existing mechanical method according to the related art can be achieved so that a drying process is shortened and the overall water removal process is shortened.

DESCRIPTION OF THE DRAWINGS

FIG. 1 is a schematic diagram showing a cathode active material dehydration apparatus using electroosmosis according to an embodiment of the present invention.

FIG. 2 is a schematic diagram showing a structure of a negative electrode of the cathode active material dehydration apparatus using electroosmosis shown in FIG. 1.

FIG. 3 is a schematic diagram showing cathode active material dehydration equipment using electroosmosis according to another embodiment of the present invention.

MODE OF THE INVENTION

Figure 4:
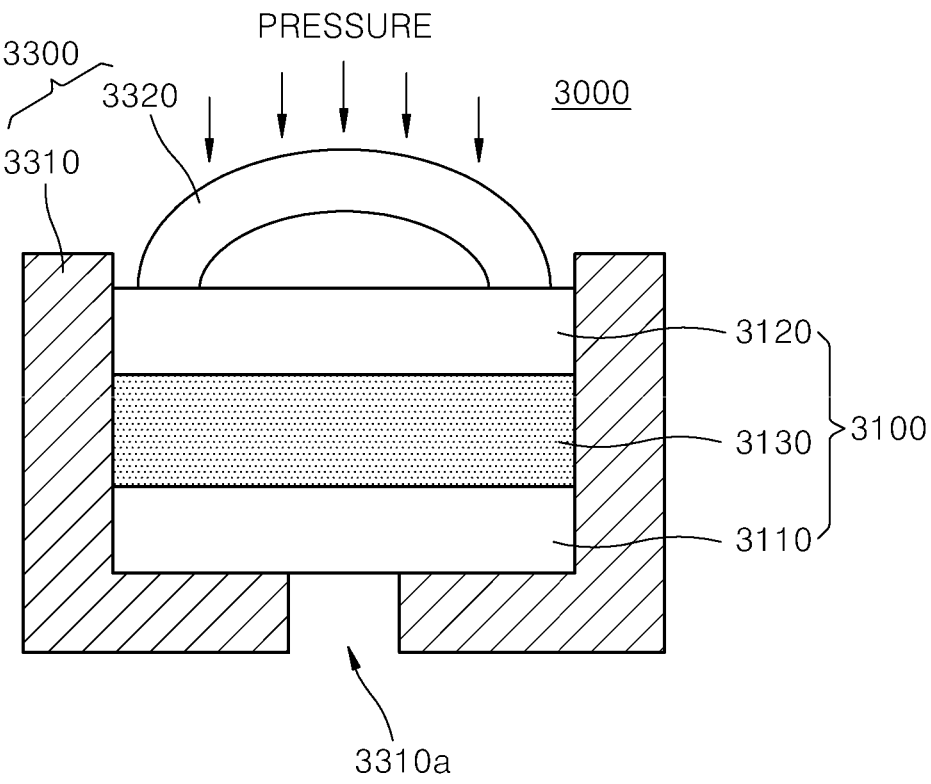
FIG. 4 is a schematic diagram showing cathode active material dehydration equipment using electroosmosis according to another embodiment of the present invention.

Hereinafter, the present invention will be described in detail by describing exemplary embodiments of the present invention with reference to the accompanying drawings.

Referring to FIGS. 1 and 2, a cathode active material dehydration apparatus 1000 using electroosmosis according to an embodiment of the present invention includes a first electrode 1110, a second electrode 1120, and a cathode active material 1130. Although not shown, the cathode active material dehydration apparatus 1000 using electroosmosis may further include a housing (not shown) for limiting an accommodation space in which the first electrode 1110, the second electrode 1120 and the cathode active material 1130 that has passed through a washing process are accommodated. In addition, although not shown in the drawings, a terminal is formed in each of the first electrode 1110 and the second electrode 1120, and power is supplied to the first electrode 1110 and the second electrode 1120 through the terminal so that an electric field is formed.

The cathode active material dehydration apparatus 1000 using electroosmosis according to the present embodiment accommodates the cathode active material 1130 that has passed through the washing process, applies the electric field to the cathode active material 1130 to dehydrate a washing solution that remains in the cathode active material 1130 using electroosmosis. That is, the cathode active material dehydration apparatus 1000 using electroosmosis according to the present embodiment exemplifies a process after the cathode active material 1130 has passed through a pressurized dehydration apparatus or a centrifugal separation dehydration apparatus in a state in which the washing solution is contained, using a washing process and the washing solution is primarily removed (mechanically-dehydrated). Thus, the cathode active material 1130 that is primarily dehydrated moves to the cathode active material dehydration apparatus 1000 using electroosmosis. In the present embodiment, the case where the washing solution is water, is exemplified.

Even after the mechanical dehydration, about 10% of water remains in the cathode active material 1130, and it takes 4 hours or more to dry a surface moisture content to less than 0.1% using a drying oven. The cathode active material dehydration apparatus 1000 using electroosmosis according to the present embodiment dehydrates the cathode active material that has passed through the mechanical dehydration before drying using the drying oven, by using electroosmosis so that a drying time using the drying oven can be reduced.

However, the present invention is not limited thereto, and mechanical dehydration (pressurized dehydration) may be performed after dehydration is performed using electroosmosis, or a dehydration integrated type structure in which dehydration and mechanical dehydration using electroosmosis are simultaneously performed. That is, according to the present invention, the order of mechanical dehydration and dehydration using electroosmosis is not fixed to improve a dehydration effect or reduce a dehydration period but may be changed in consideration of several complicated conditions. Thus, according to the present invention, the dehydration effect can be improved by sequentially performing mechanical dehydration, dehydration using electroosmosis and drying by changing the order thereof or by simultaneously performing two or three of mechanical dehydration, dehydration using electroosmosis and drying.

The first electrode 1110 and the second electrode 1120 have a potential difference. In the present embodiment, the case where the first electrode 1110 is a negative electrode and the second electrode 1120 is a positive electrode, is exemplified. The first electrode 1110 and the second electrode 1120 are spaced apart from each other with the cathode active material 1130 therebetween.

Referring to FIG. 2, the first electrode 1110 has a plate shape and a mesh structure. In the present embodiment, the first electrode 1110 is formed in the mesh structure, as shown in (a), so that water can pass through the first electrode 1110. In the drawings, for convenience of illustration, a passage through which water can pass, is marked large, but the first electrode 1110 is formed densely, as shown in a filter 1110b of (b). However, the present invention is not limited thereto, and the first electrode 1110 may include negative electrodes 1110a that cross each other, and the filter 1110b disposed in close contact with the negative electrodes 1110a, as shown in (b). Of course, the filter 1110b may be disposed in close contact with a lower portion of the negative electrodes 1110a. That is, the negative electrodes 1110a may be installed at any place of one side that is an upper portion of the filter 1110b or the other side that is a lower portion thereof. In this case, the filter 1110b may have a plate shape and only has a structure through which the cathode active material cannot pass but water can pass. As an example of the filter 1110b, there is a filter membrane. The washing solution dehydrated from the cathode active material 1130 is discharged to the outside through the first electrode by gravity.

The second electrode 1120 is spaced apart from the first electrode 1110 to face each other so that the cathode active material 1130 can be disposed between the second electrode 1120 and the first electrode 1110. In the present embodiment, the case where the second electrode 1120 is spaced apart from an upper portion of the first electrode 1110 to face the first electrode 1110, is exemplified. In the present embodiment, the case where the second electrode 1120 has a plate shape and a structure through which water cannot pass, is exemplified. However, the present invention is not limited thereto, and the second electrode 1120 may have a structure through which water can pass, as in the first electrode 1110. In this case, the second electrode 1120 may be formed in a mesh structure, as in the first electrode 1110, and is formed to have a denser structure than the mesh structure of the first electrode 1110.

The cathode active material 1130 is disposed between the first electrode 1110 and the second electrode 1120. In the present embodiment, the case where the cathode active material 1130 is a lithium composite transition metal oxide, is exemplified. The lithium composite transition metal oxide may be manufactured by mixing a transition metal precursor and a lithium raw material with each other and then by firing them. The transition metal precursor may be hydroxide including nickel (Ni), cobalt (Co), and manganese (Mn), oxyhydroxide, carbonate, and an organic complex. Specifically, the transition metal precursor may be nickel-cobalt hydroxide, nickel-cobalt oxyhydroxide, nickel-cobalt-manganese hydroxide, nickel-cobalt-manganese oxyhydroxide, or the hydroxide or oxyhydroxide doped with M, but the present invention is not limited thereto. However, the present invention is not limited thereto, and the type and manufacturing method of the cathode active material 1130 may be changed.

The operation of the cathode active material dehydration apparatus 1000 using electroosmosis will be briefly described, and first, the cathode active material 1130 that is washed with water and has passed through a mechanical dehydration process is disposed between the first electrode 1110 and the second electrode 1120. In the present embodiment, the case where the cathode active material 1130 is disposed in close contact with the first electrode 1110 and the second electrode 1120, respectively, is exemplified. However, the cathode active material 1130 may be disposed to be spaced apart from the first electrode 1110 and the second electrode 1120, respectively. In this case, an apparatus for fixing the cathode active material 1130 between the first electrode 1110 and the second electrode 1120 is required.

Next, power is applied to the first electrode 1110 and the second electrode 1120. When power is applied to the first electrode 1110 and the second electrode 1120, osmotic pressure in which water contained in the cathode active material 1130 flows to the first electrode 1110, occurs. This is because positive ions distributed in water move to the negative electrode due to electricity and water molecules are also dragged (water molecules are coupled to the positive ions due to ion-dipole attraction so that, when the positive ions move by electricity, portions thereof move along.) In this case, there is an additional effect in which lithium ions that remain on the surface of the cathode active material 1130 move to the first electrode 1110.

Even if water is removed from the cathode active material 1130 that has passed through the washing process through pressurized dehydration (mechanical dehydration), dehydration by pressurization cannot be performed due to the electrical force acting between ions and particles within water (because the particle surface is has an electric charge due to an interface phenomenon between solid and liquid). Thus, there is a limitation in removing water contained in the cathode active material 1130 sufficiently only using pressurized dehydration. In this case, by using the cathode active material dehydration apparatus 1000 using electroosmosis according to the present embodiment, the remaining water can be easily removed using electroosmosis.

Referring to FIG. 3, cathode active material dehydration equipment 2000 using electroosmosis according to another embodiment of the present invention includes a cathode active material dehydration apparatus 2100 using electroosmosis and a drying apparatus 2200. The cathode active material dehydration apparatus 2100 using electroosmosis includes a first electrode 2110, a second electrode 2120, and a cathode active material 2130. In the present embodiment, the case where the first electrode 2110 is a negative electrode and the second electrode 2120 is a positive electrode, is exemplified. The cathode active material dehydration apparatus 2100 using electroosmosis dehydrates water that is a washing solution remaining in the cathode active material 2130 using electroosmosis by applying an electric field to the cathode active material 2130 that has passed through the washing process. The cathode active material dehydration apparatus 2100 using electroosmosis is disposed in the drying apparatus 2200. That is, in the present embodiment, the cathode active material dehydration apparatus 2100 using electroosmosis and the drying apparatus 2200 are formed as a single body. The cathode active material dehydration apparatus 2100 using electroosmosis is similar to the cathode active material dehydration apparatus 1000 using electroosmosis shown in FIG. 1 and thus, a detailed description thereof is omitted.

The drying apparatus 2200 dries the cathode active material 2130 by heating the cathode active material 2130 in a state in which the cathode active material 2130 is kept in an internal space of the drying apparatus 2200. The drying apparatus 2200 includes a housing 2210 and an electric heater 2220. The housing 2210 defines an accommodation space in which the cathode active material dehydration apparatus 2100 using electroosmosis is accommodated. That is, the cathode active material dehydration apparatus 2100 using electroosmosis is disposed in the accommodation space inside the housing 2210. A hole 2210a is formed in the center of a lower portion of the housing 2210. The hole 2210a is a passage through which water discharged from the cathode active material 2130 is discharged to the outside of the housing 2210 by gravity.

The electric heater 2220 is installed on an inner surface of the housing 2210 so as to transfer radiation heat toward the accommodation space inside the housing 2210. In the present embodiment, the case where the electric heater 220 is installed throughout the inner surface of the housing 2210, is exemplified, but the electric heater 2210 may also be installed only at a portion of the inner surface of the housing 2210. That is, because the first electrode 2110 and the second electrode 2120 are not formed in the electric heater 2210, the electric heater 2210 may also be installed only at a side surface of the housing 2210 to which heat may be directly transferred to the cathode active material 2130. Also, although not shown in the drawings, a hot air blower discharging hot air may be installed on an inner surface of the housing 2210 to transfer heat by convection toward the accommodation space.

In the present embodiment, dehydration and drying of water that is a washing solution contained in the cathode active material 2130 is performed in such a way that drying of water is performed after dehydration of water is first performed. However, the present invention is not limited thereto, and dehydration of the washing solution and drying of the washing solution may also be simultaneously performed.

Referring to FIG. 4, cathode active material dehydration equipment 3000 using electroosmosis according to another embodiment of the present invention includes a cathode active material dehydration apparatus 3100 using electroosmosis and a pressurized dehydration apparatus 3200. The cathode active material dehydration apparatus 3100 using electroosmosis includes a first electrode 3110, a second electrode 3120, and a cathode active material 3130. In the present embodiment, the case where the first electrode 3110 is a negative electrode and the second electrode 3120 is a positive electrode, is exemplified. The cathode active material dehydration apparatus 3100 using electroosmosis dehydrates water that is a washing solution remaining in the cathode active material 3130 using electroosmosis by applying an electric field to the cathode active material 3130 that has passed through the washing process. The cathode active material dehydration apparatus 3100 using electroosmosis is disposed in the pressurized dehydration apparatus 3200. That is, in the present embodiment, the cathode active material dehydration apparatus 3100 using electroosmosis and the pressurized dehydration apparatus 3200 are formed as a single body. The cathode active material dehydration apparatus 3100 using electroosmosis is similar to the cathode active material dehydration apparatus 1000 using electroosmosis shown in FIG. 1 and thus, a detailed description thereof is omitted.

The pressurized dehydration apparatus 3200 dehydrates water that is a washing solution that remains in the cathode active material 2130 by applying compressive force (mechanical force) to the cathode active material 2130 that has passed through the washing process. The pressurized dehydration apparatus 3200 includes a housing 3310 and a pressurization apparatus 3320. The housing 3310 has an accommodation space therein, and accommodates the washed cathode active material 3130 in the accommodation space. In the present embodiment, the case where the housing 3310 has a rectangular shape with an open upper portion, is exemplified. A hole 3310a through which water that is a washing solution may be discharged, is formed in the center of a lower portion of the housing 3310. However, the present invention is not limited thereto, and the shape of the housing 3310 or the position of the hole 3310a may be changed.

The pressurization apparatus 3320 pressurizes the cathode active material 3130 top to bottom so that water that is a washing solution can be discharged by pressure. The pressurization apparatus 3320 is installed at an upper portion of the housing 3310. The pressurization apparatus 3320 may be formed as a single body with the housing 3310 or may be formed separately. In the present embodiment, the case where the pressurization apparatus 3320 is formed in a semi-elliptical shape protruding upward, is exemplified. This is to secure a room space in which a terminal is to be formed on the second electrode 3120. However, the present invention is not limited thereto, and the structure of the pressurization apparatus 3320 may be changed.

In the present embodiment, side surfaces of the first electrode 3110 and the second electrode 3120 are in close contact with the inside of the housing 3310. Also, the lower surface of the first electrode 3110 is disposed to be in close contact with an inside of a lower surface of the housing 3310. The second electrode 3120 is disposed at a lower portion of the pressurization apparatus 3320. In the present embodiment, the pressurization apparatus 3320 is movable in a vertical direction, is in close contact with an upper surface of the second electrode 3120 to apply force in a downward direction to perform pressurized dehydration.

Figure 5:
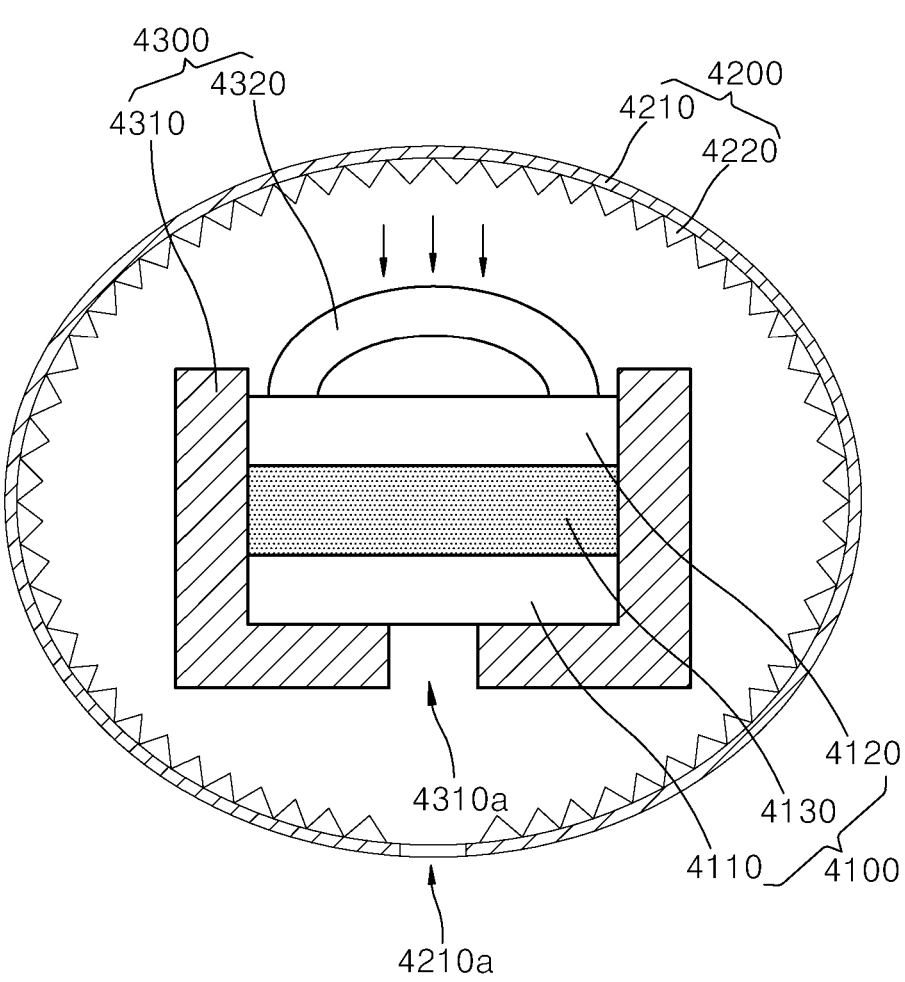
FIG. 5 is a schematic diagram showing cathode active material dehydration equipment using electroosmosis according to another embodiment of the present invention.

Referring to FIG. 5, cathode active material dehydration equipment 4000 using electroosmosis according to another embodiment of the present invention includes a cathode active material dehydration apparatus 4100 using electroosmosis, a drying apparatus 4200, and a pressurized dehydration apparatus 4200. The cathode active material dehydration apparatus 4100 using electroosmosis includes a first electrode 4110, a second electrode 4120, and a cathode active material 4130. In the present embodiment, the case where the first electrode 4110 is a negative electrode and the second electrode 4120 is a positive electrode, is exemplified. The cathode active material dehydration apparatus 4100 using electroosmosis dehydrates water that is a washing solution remaining in the cathode active material 4130 using electroosmosis by applying an electric field to the cathode active material 4130 that has passed through the washing process. The cathode active material dehydration apparatus 4100 using electroosmosis is disposed in the pressurized dehydration apparatus 4200. The cathode active material dehydration apparatus 4100 using electroosmosis is similar to the cathode active material dehydration apparatus 1000 using electroosmosis shown in FIG. 1 and thus, a detailed description thereof is omitted.

The pressurized dehydration apparatus 4300 dehydrates water that is a washing solution that remains in the cathode active material 4130 by applying compressive force (mechanical force) to the cathode active material 4130 that has passed through the washing process. The pressurized dehydration apparatus 4200 includes a housing 4310 and a pressurization apparatus 4320. The pressurized dehydration apparatus 4200 is similar to the pressurized dehydration apparatus 3200 shown in FIG. 4 and thus, a detailed description thereof is omitted. The arrangement and coupling structure of the cathode active material dehydration apparatus 4100 and the pressurized dehydration apparatus 4300 using electroosmosis according to the present embodiment are similar to the arrangement and coupling structure of the cathode active material dehydration apparatus 3100 and the pressurized dehydration apparatus 3300 using electroosmosis shown in FIG. 4 and thus, a detailed description thereof is omitted.

The drying apparatus 4200 includes a housing 4210 and an electric heater 4220. The housing 4210 defines an accommodation space in which the cathode active material dehydration apparatus 4100 using electroosmosis and the pressurized dehydration apparatus 4300 are accommodated. That is, the cathode active material dehydration apparatus 4100 using electroosmosis and the pressurized dehydration apparatus 4300 are disposed in the accommodation space inside the housing 4210. A hole 4210a is formed in the center of a lower portion of the housing 4210. The hole 4210a is a passage through which water discharged from the cathode active material 4130 is discharged to the outside of the housing 4210.

The electric heater 4220 is installed on an inner surface of the housing 4210 to transfer radiation heat toward the accommodation space inside the housing 4210. In the present embodiment, the case where the electric heater 4210 is installed throughout the inner surface of the housing 4210, is exemplified, but the electric heater 4210 may also be installed only at a portion of the inner surface of the housing 4210. Also, although not shown in the drawings, a hot air blower discharging hot air may be installed on an inner surface of the housing 2210 to transfer heat by convection toward the accommodation space. In the cathode active material dehydration equipment 4000 using electroosmosis according to the present embodiment, the cathode active material dehydration apparatus 4100 using electroosmosis, the drying apparatus 4200, and the pressurized dehydration apparatus 4300 are formed as a single body and thus, dehydration and drying can be performed using one equipment.

In the present embodiment, the processes of dehydrating a washing solution remaining in the cathode active material 4130 using the pressurized dehydration apparatus 4300 and applying an electric field to the cathode active material 4130 dehydrated by the pressurized dehydration apparatus 4300 using the cathode active material dehydration apparatus 4100 using electroosmosis so that the washing solution remaining in the cathode active material 4130 is dehydrated and the cathode active material 4130 is dried using the drying apparatus 4200, are sequentially performed, is exemplified. However, the present invention is not limited thereto, and the cathode active material dehydration apparatus 4100 using electroosmosis, the drying apparatus 4200, and the pressurized dehydration apparatus 4300 simultaneously operate so that dehydration and drying of the cathode active material 4130 can be performed at one time.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

By using the present invention, a cathode active material dehydration apparatus in which water that remains in a cathode active material even after mechanical dehydration is performed can be effectively removed by using electroosmosis, and dehydration equipment including the dehydration apparatus can be provided.

The invention claimed is:

1. A cathode active material dehydration method using electroosmosis, comprising: providing a cathode active material dehydration apparatus, accommodating a cathode active material that has passed through a washing process in the cathode active material dehydration apparatus, and applying an electric field to the cathode active material to remove, through electroosmosis, a washing solution remaining in the cathode active material, wherein the electroosmosis suppresses residual lithium.

2. The cathode active material dehydration method of claim 1, comprising:
   a housing for defining an accommodation space in which the cathode active material that has passed through the washing process is accommodated; and
   a first electrode and a second electrode, which are arranged with the cathode active material therebetween and have a potential difference.

3. The cathode active material dehydration method of claim 2, wherein the first electrode is a negative electrode, and the second electrode is a positive electrode.

4. The cathode active material dehydration method of claim 2, wherein the first electrode has a plate shape and has a mesh structure.

5. The cathode active material dehydration method of claim 2, wherein the second electrode is spaced apart from the first electrode to face the first electrode so that the cathode active material is disposed between the second electrode and the first electrode.

6. The cathode active material dehydration method of claim 4, wherein the second electrode is disposed on the first electrode to be spaced apart from the first electrode to face the first electrode so that the cathode active material is disposed between the second electrode and the first electrode, and the washing solution dehydrated from the cathode active material is discharged to the outside through the first electrode by gravity.

7. The cathode active material dehydration method of claim 2, wherein the first electrode comprises:
   a filter through which the cathode active material does not pass and the washing solution dehydrated from the cathode active material passes; and
   an electrode disposed on one side of the filter.

8. The cathode active material dehydration method of claim 7, wherein the second electrode is spaced apart from the first electrode to face the first electrode so that the cathode active material is disposed between the second electrode and the first electrode, and the second electrode has a plate shape and has a mesh structure, and the first electrode has a plate shape and a mesh structure, and the mesh structure of the second electrode is denser than the mesh structure of the first electrode.

9. The cathode active material dehydration method of claim 1, wherein the cathode active material introduced into the dehydration apparatus is a cathode active material that is primarily dehydrated.

10. The cathode active material dehydration method of claim 9, wherein the primary dehydration is performed by pressurization or centrifugal separation.

11. The cathode active material dehydration method of claim 1, wherein the cathode active material is a lithium composite transition metal oxide.

12. A cathode active material dehydration method using electroosmosis, comprising: providing cathode active material dehydration equipment, accommodating a cathode active material that has passed through a washing process in an internal space of the cathode active material dehydration equipment, and applying an electric field to the cathode active material to remove, through electroosmosis, a washing solution remaining in the cathode active material wherein the electroosmosis suppresses residual lithium, and performing drying by heating the cathode active material in a state where the cathode active material is kept in the internal space.

13. The cathode active material dehydration method of claim 12, comprising:
   a housing for defining an accommodation space in which the cathode active material that has passed through the washing process is accommodated;
   an electric heater installed on an inner surface of the housing to transfer radiation heat toward the accommodation space or a hot air blower discharging hot air installed on the inner surface of the housing to perform heat transfer by convection toward the accommodation space; and
   a first electrode and a second electrode, which are arranged with the cathode active material therebetween and have a potential difference.

14. The cathode active material dehydration method of claim 12, wherein dehydration and drying of the washing solution is simultaneously performed, or the drying is performed after dehydration of the washing solution is performed.

15. A cathode active material dehydration method using electroosmosis, comprising: providing cathode active material dehydration equipment, accommodating a cathode active material that has passed through a washing process in an internal space of the cathode active material dehydration equipment, and applying mechanical force to the cathode active material to remove a washing solution remaining in the cathode active material, and dehydrating the washing solution remaining in the cathode active material by applying an electric field to the cathode active material through electroosmosis in a state where the cathode active material is kept in the internal space, wherein the electroosmosis suppresses residual lithium.

16. The cathode active material dehydration method of claim 15, comprising:
  a pressurized dehydration apparatus comprising a housing having an accommodation space therein and accommodating the washed cathode active material in the accommodation space and a pressurization apparatus installed at an upper portion of the housing and pressurizing the cathode active material disposed in the housing; and
  an electro-osmotic dehydration apparatus disposed in the accommodation space of the housing and comprising a first electrode and a second electrode arranged with the cathode active material therebetween and having a potential difference.

17. The cathode active material dehydration method of claim 16, wherein the housing has a hole which is formed in a lower portion thereof and through which the washing solution is discharged in a downward direction.

18. The cathode active material dehydration method of claim 16, wherein the first electrode is a negative electrode, and the second electrode is a positive electrode, and each of side surfaces of the negative electrode and the positive electrode is in close contact with an inside of the housing, and the positive electrode is disposed at a lower portion of the pressurization apparatus, and the negative electrode is disposed to be in close contact with an inside of a lower surface of the housing.

19. A cathode active material dehydration method using electroosmosis, comprising: providing cathode active material dehydration equipment, accommodating a cathode active material that has passed through a washing process in an internal space of the cathode active material dehydration equipment, and applying mechanical force to the cathode active material to remove a washing solution remaining in the cathode active material, dehydrating the washing solution remaining in the cathode active material by applying an electric field to the cathode active material through electroosmosis in a state where the cathode active material is kept in the internal space wherein the electroosmosis suppresses residual lithium, and performing drying by heating the cathode active material in a state where the cathode active material is kept in the internal space.

* * * * *